US012632268B2

(12) United States Patent
He et al.

(10) Patent No.: US 12,632,268 B2
(45) Date of Patent: May 19, 2026

(54) EMBEDDED CONTROLLER TO EXIT AN UNRESPONSIVE STANDBY STATE

(71) Applicant: DELL PRODUCTS L.P., Round Rock, TX (US)

(72) Inventors: Qinghong He, Austin, TX (US); Adolfo Montero, Pflugerville, TX (US); Suraj M. Varma, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 18/417,112

(22) Filed: Jan. 19, 2024

(65) Prior Publication Data

US 2025/0238241 A1 Jul. 24, 2025

(51) Int. Cl.
G06F 9/4401 (2018.01)
G06F 1/3234 (2019.01)

(52) U.S. Cl.
CPC .......... G06F 9/4418 (2013.01); G06F 1/3234 (2013.01)

(58) Field of Classification Search
CPC .............................. G06F 9/4418; G06F 1/3234
See application file for complete search history.

(56) References Cited

U.S. PATENT DOCUMENTS

| 11,017,823 B1 * | 5/2021 | Kamepalli | .............. G06F 1/206 |
| 11,500,449 B1 * | 11/2022 | Suryanarayana | ......... G06F 1/28 |
| 11,669,469 B2 | 6/2023 | Iyer et al. | |
| 11,709,500 B2 * | 7/2023 | Lloyd | .................... G07C 5/008 |
| | | | 713/320 |
| 2007/0219644 A1 * | 9/2007 | Sonobe | ................. G06F 1/3203 |
| | | | 700/12 |
| 2011/0302436 A1 * | 12/2011 | Clark | ................ H04W 52/0225 |
| | | | 713/323 |
| 2013/0103900 A1 * | 4/2013 | Chiu | ................... G06F 11/3058 |
| | | | 711/112 |
| 2013/0185789 A1 * | 7/2013 | Hagiwara | ............. G06F 21/554 |
| | | | 726/18 |
| 2014/0032817 A1 * | 1/2014 | Bux | ..................... G06F 12/0261 |
| | | | 711/E12.008 |
| 2014/0143572 A1 * | 5/2014 | Horiuchi | .............. G06F 9/4418 |
| | | | 713/323 |
| 2014/0304542 A1 * | 10/2014 | Rogers | ...................... G06F 1/30 |
| | | | 713/340 |

(Continued)

*Primary Examiner* — Aurel Prifti

(74) *Attorney, Agent, or Firm* — Larson Newman, LLP

(57) ABSTRACT

An information handling system includes a memory and an embedded controller. The memory store multiple threshold values associated with a current state of the information handling system. The embedded controller determines whether the information handling system has initiated a modern standby (MODS) power state entry. In response to the initiation of the MODS power state entry, the embedded controller determines whether a MODS timeout has expired prior to the completion of the MODS power state entry. In response to the MODS timeout having expired, the embedded controller determines whether one of the threshold values has been exceeded. In response to one of the threshold values having been exceeded, the embedded controller forces the information handling system to exit the initiated MODS power state entry and enter the information handling system in a hibernate power state.

17 Claims, 5 Drawing Sheets

(56) References Cited

U.S. PATENT DOCUMENTS

| | | | |
|---|---|---|---|
| 2015/0227377 A1* | 8/2015 | Park | G06F 9/4418 |
| | | | 713/2 |
| 2017/0010643 A1* | 1/2017 | Wu | G05B 19/048 |
| 2019/0073023 A1* | 3/2019 | Kosugi | G06F 1/206 |
| 2020/0233479 A1* | 7/2020 | Tsukamoto | G06F 1/3296 |
| 2022/0269574 A1* | 8/2022 | Chaiken | G06F 1/3234 |
| 2022/0413585 A1* | 12/2022 | Iyer | G06F 1/3234 |

* cited by examiner

EMBEDDED CONTROLLER TO EXIT AN UNRESPONSIVE STANDBY STATE

FIELD OF THE DISCLOSURE

The present disclosure generally relates to information handling systems, and more particularly relates to exiting an unresponsive modern standby state.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and an embedded controller. The memory store multiple threshold values associated with a current state of the information handling system. The embedded controller may determine whether the information handling system has initiated a modern standby (MODS) power state entry. In response to the initiation of the MODS power state entry, the embedded controller may determine whether a MODS timeout has expired prior to the completion of the MODS power state entry. In response to the MODS timeout having expired, the embedded controller may determine whether one of the threshold values has been exceeded. In response to one of the threshold values having been exceeded, the embedded controller may force the information handling system to exit the initiated MODS power state entry and enter the information handling system in a hibernate power state.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
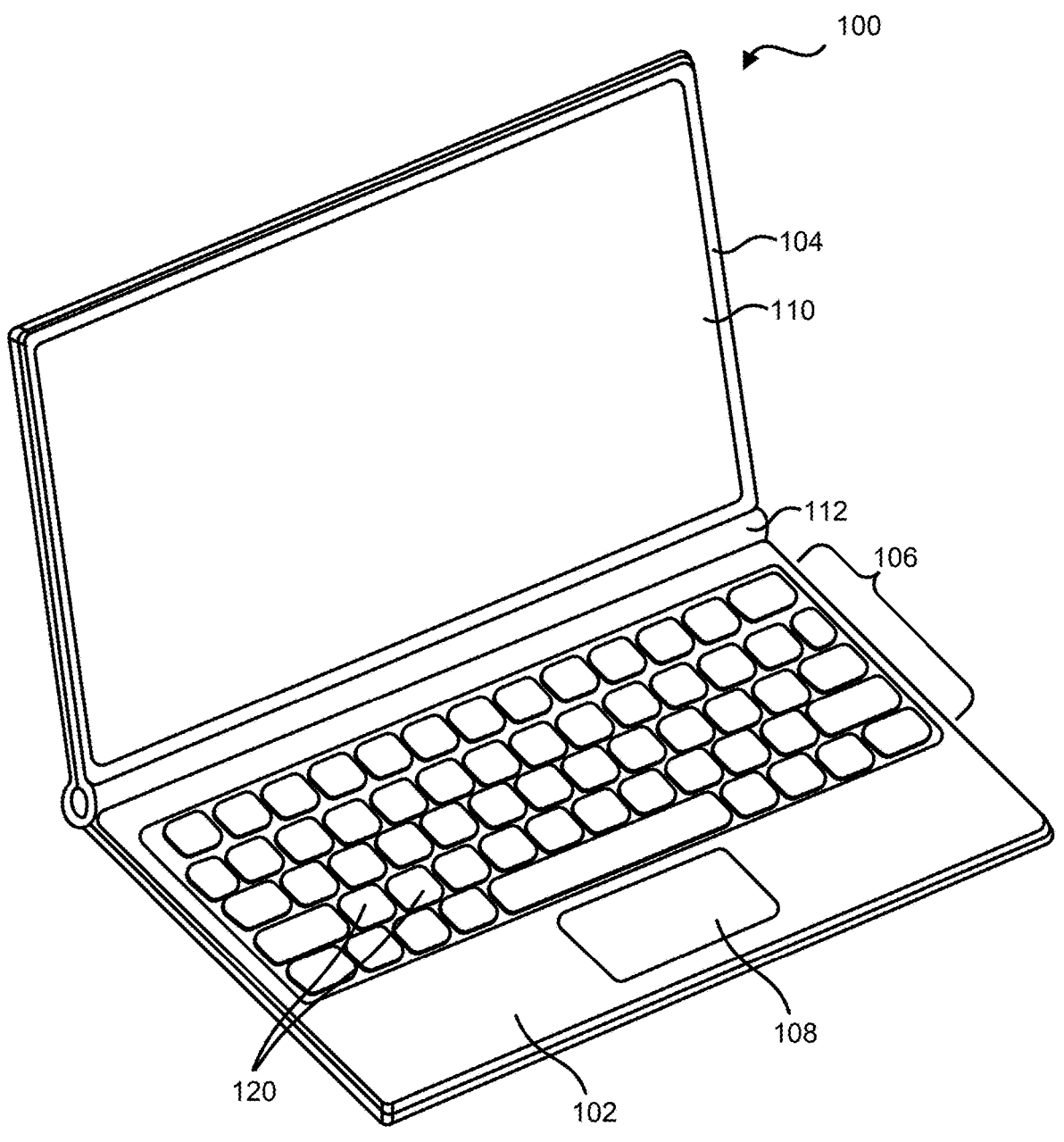
FIG. 1 is a perspective view of an information handling system according to at least one embodiment of the present disclosure.

FIG. 1 shows an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top or lid 104. Base portion 102 includes a keyboard 106 and a touchpad 108, and top portion 104 includes a display device 110. In an example, touchpad 108 may be any suitable pointing device. Base portion 102 is connected top portion 104 via a mechanism 112, such as one or more hinges. Keyboard 106 includes multiple keys 120. When the information handling system 100 comprises a 2-in-1 device, mechanism 112 may enable the top portion 104 to be connected to bottom portion 102 for use as a laptop device and may enable the top portion 104 to be detached from bottom portion 102 to enable the top portion 104 to be used as a tablet information handling system. Display device 110 may include one or more light emitting devices, such as, for example, light emitting diodes (LEDs), organic LED (OLED), liquid crystal display (LCD), another type of light emitting device, or any combination thereof.

In an example, when lid 104 is closed, information handling system 100 may perform one of multiple different operations. In certain examples, the operations performed based on lid 104 being closed may be based on different user settings. For example, a user may set information handling system 100 to do nothing when lid 104 is closed, enter sleep mode when the lid is closed, or the like. In an example, different issue may arise in information handling system 100 when lid 104 is closed. For example, if information handling system 100 is place in a bag after lid 104 is closed, the system may heat up and/or the battery may be drained. When issues arise after information handling system 100 is placed in a bag, it will be referred to herein as a system-in-a-bag (SIAB) issue.

In certain examples, a SIAB issue may arise from the 'do nothing' user setting. This SIAB issue may result because information handling system 100 may not stop running whatever applications were already running and enough heat may be generated to turn the enclosed environment with no airflow into an overheated information handling system. If information handling system is in the 'sleep' user setting when lid 104 is closed, the information handling system may not support a sleep, S3, state, but may attempt to enter a modern standby (MODS) mode (SOix). If information handling system 100 successfully enters MODS mode, the power dissipation may be very low, such as <0.5 W, and a hot-bag issue may not be a concern unless the enclosed environment is a perfect insulator. However, if information handling system 100 is not able to enter MODS, the information handling system may get stuck and fail to enter low power mode. In this situation, information handling system 100 may have a power consumption that is substantially similar to the 'do nothing' user setting, and the system may quickly overheat, and battery may quickly drain.

In certain examples, the root cause for the vast majority of the hot bag issues may be due to information handling system 100 hanging in the process of entering MODS. Before information handling system 100 is able to complete entry into MODS, all system components must enter standby mode and the OS must also successfully halt all of the running applications. In an example, applications listed in a task manager of information handling system 100 may be some of the typical applications to halted before entry into the MODS. If any of the software components cannot enter standby mode, the entire system may get stuck in the process of MODS entry and the CPU, such as CPU 202 of FIG. 2, may continue dissipating at normal power levels. Additionally, a WWAN of information handling system 100 may not have a proper driver installed for a WWAN component, and as a result the WWAN may prevent the information handling system from entering the lower power mode.

After enough heat has accumulated, the bag interior may get extremely hot. As an additional issue, the battery may also drain at very high temperatures, thus shortening the longevity of the battery overall, have a higher power drain causing the battery to drain faster, and the battery health may degrade due to higher temperatures. Information handling system 100 may be improved by an embedded controller (EC), such as embedded controller 204 of FIG. 2, causing the information handling system 100 to enter a hibernate mode when a failure to enter MODS arises.

Figure 2:
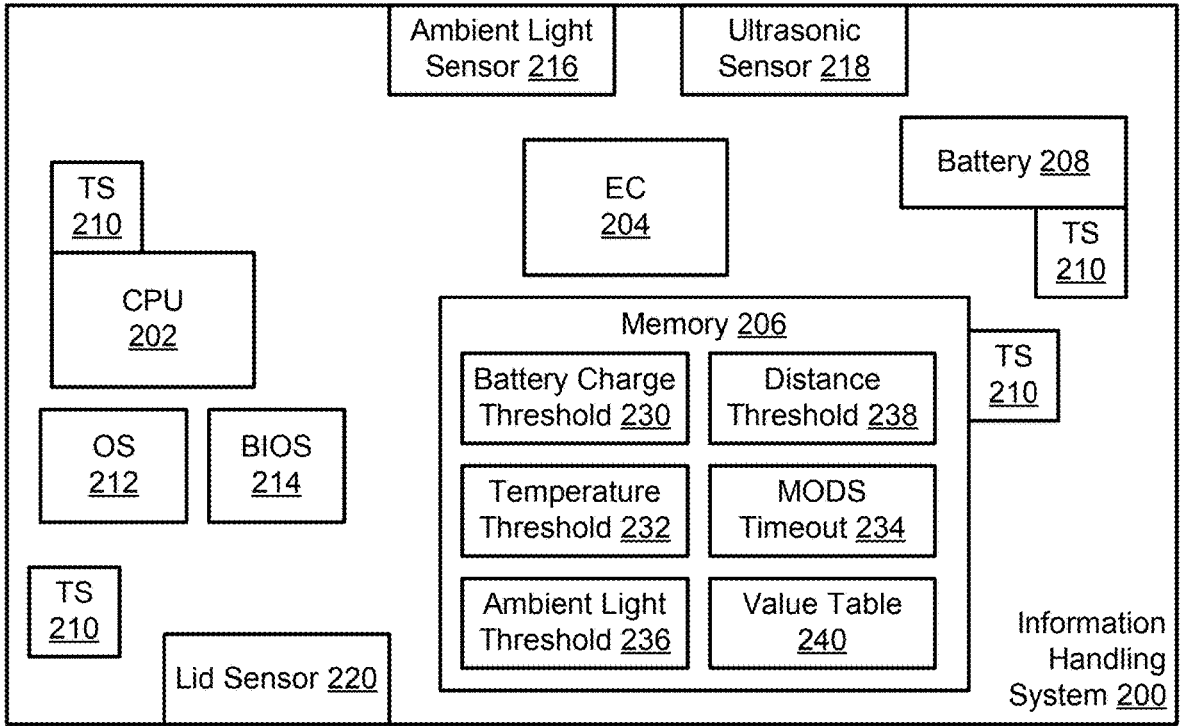
FIG. 2 is a block diagram of an information handling system according to at least one embodiment of the present disclosure.

FIG. 2 illustrates a portion of an information handling system 200 according to at least one embodiment of the present disclosure. Information handling system 200 may be substantially similar to information handling system 100 of FIG. 1. Information handling system 200 includes CPU 202, EC 204, a memory 206, battery 208, multiple temperature sensors 210, an operating system (OS) 212, a basic input/output system (BIOS) 214, an ambient light sensor 216, an ultrasonic proximity sensor 218, and a lid sensor 220. In an example, memory 206 may store data associated with components of information handling system, such as OS 210, BIOS 212, and may also store a battery charge threshold value 230, a temperature threshold value 232, a MODS timeout 234, an ambient light threshold value 236, a distance threshold value 238, a value table 240, or the like. In an example, information handling system 200 may include additional components without varying from the scope of this disclosure.

In an example, lid sensor 220 may detect a closure of a lid, such as lid 104 of FIG. 1. In response to the lid closure detection, lid sensor 220 may provide a closure notification to EC 204. Based on the closure notification, EC 204 in conjunction with BIOS 214 may initiate a MODS entry of OS 212. In certain examples, operations of EC 204, OS 212, ambient light sensor 216, and ultrasonic proximity sensor 218 will be described with respect to power state diagram 300 of FIGS. 3 and 4 and with respect to FIG. 2.

Figure 3:
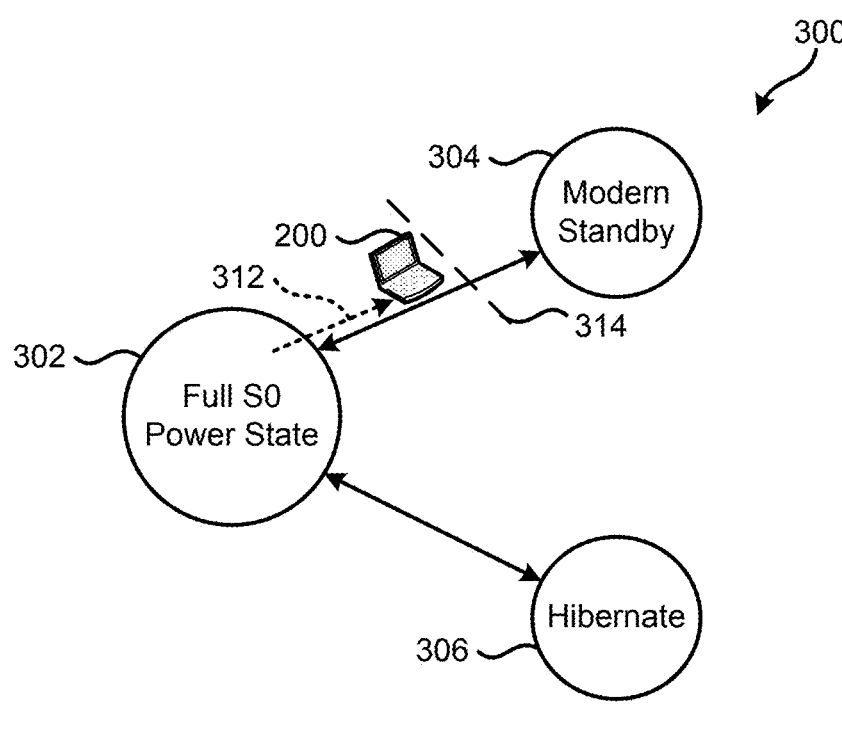
FIGS. 3 and 4 are state diagrams for power states in an information handling system according to at least one embodiment of the present disclosure.
Figure 4:
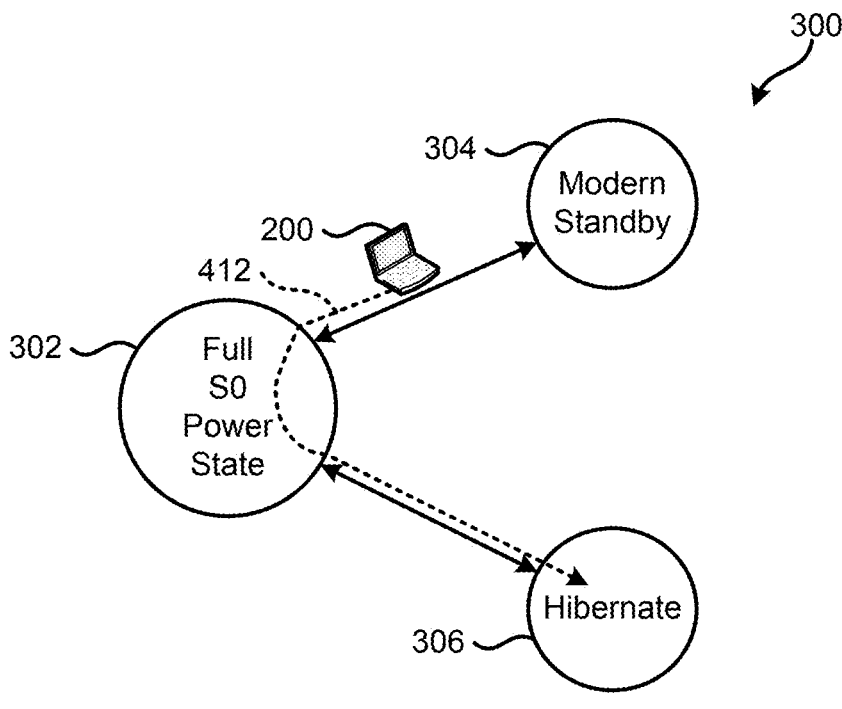

FIGS. 3 and 4 illustrate power state diagram 300 for power states of information handling system 200 according to at least one embodiment of the present disclosure. Power state diagram 300 includes a full power state 302, a MODS power state 304, and a hibernate power state 306. In an example, power state diagram 300 may include additional power states without varying from the present disclosure.

In an example, a MODS entry initiation 312 of information handling system 200 is illustrated by dashed arrow extending from full power state 302 toward MODS power state 304. In response to MODS entry initiation 312, EC 204 may set MODS timeout 234. During the entry into MODS power state 304, information handling system 200 may enter a stuck mode, as indicated by dashed line 314. Information handling system 200 may enter stuck mode 314 as a result of multiple conditions. For example, stuck mode 314 may result if any components of information handling system 200 fail to enter the standby mode first, OS 212 fails to halt all of the running applications, or the like.

Referring back to FIG. 2, while information handling system 200 is in stuck mode 314 of FIG. 3, EC 204 may continuously determine whether MODS timeout 234 has expired. In an example, MODS timeout 234 may be set for any particular amount of time after which the chances that the information handling system enters MODS power state 304 is substantially diminished. In response to the expiration of MODS timeout 234, EC 204 may perform one or more operations to determine whether information handling system 200 should be forced out of stuck mode 314. For example, EC 204 may determine whether information handling system 200 is in a bag or similar enclosure, check the system temperature, the battery level, or the like.

In an example, EC 204 may communicate with ambient light sensor 216 and ultrasonic proximity sensor 218 to determine whether information handling system 200 is a SIAB or similar. In certain examples, ambient light sensor 216 may detect the amount of ambient light around information handling system 200 and provide the detected amount of ambient light to EC 204. In response to receiving the amount of ambient light, EC 204 may compare the detected amount of ambient light to ambient light threshold value 236 stored in memory 206. When the detected ambient light is below ambient light threshold value 236, EC 204 may return a true value for SIAB indicator. If the detected ambient light is above ambient light threshold value 236, EC 204 may return a false value for the SIAB indicator. In an example, EC 204 may store the true or false value for the SIAB indicator associated with ambient light in value table 240.

In certain examples, ultrasonic proximity sensor 218 may detect the distance between information handling system 200 and a nearest object or surface and provide the detected distance to EC 204. In response to receiving the distance, EC 204 may compare the detected distance to ambient distance threshold value 238 stored in memory 206. When the detected distance is less than distance threshold value 238, EC 204 may return a true value for SIAB indicator. If the detected distance is greater than distance threshold value 238, EC 204 may return a false value for SIAB indicator. In response to true value, EC 204 may determine that information handling system 200 is in a bag or similar enclosure, and that OS 212 should be forced out of MODS entry stuck mode 314. In an example, EC 204 may store the true or false value for the SIAB indicator associated with proximity in value table 240.

In an example, EC 204 may also utilize different temperatures within information handling system 200 to determine whether to force OS 212 out of stuck mode 314 of FIG. 3. For example, EC 204 may continuously retrieve different temperatures from temperatures sensors 210 located throughout information handling system 200. In certain examples, temperature sensors 210 may be associated with different components of information handling system 200. For example, one temperature sensor 210 may be located near CPU 202 and provide the temperature of the CPU to EC 204. Another temperature sensor 210 may be located near memory 206 and provide the temperature of the memory to EC 204. Another temperature sensor 210 may be located near battery 208 and provide the temperature of the battery to EC 204. Still other temperature sensors 210 may be located at other places within information handling system 200 and provide the temperatures at these locations to EC 204.

In response to receiving the different temperatures from temperature sensors 210, EC 204 may compare each of the received temperatures to temperature threshold value 232. If any of the received temperatures is greater than temperature threshold value 232, EC 204 may return a true value for a high temperature indicator. If none of the received temperatures are greater than temperature threshold value 232, EC 204 may return a false value for the high temperature indicator. In an example, EC 204 may store the true or false value for the temperature indicator in value table 240.

In an example, EC 204 may also utilize a battery capacity of battery 208 within information handling system 200 to determine whether to force OS 212 out of stuck mode 314 of FIG. 3. EC 204 may continuously receive the battery capacity for battery 208 and compare the received battery capacity to battery charge threshold value 230 stored in memory 206. In an example, the battery charge threshold value may be any suitable battery capacity level, such as a capacity percentage that is higher than a percentage at which information handling system 200 is automatically shut down. If the received battery capacity is less than battery charge threshold value 230, EC 204 may provide a true value for the battery capacity. If the received battery capacity is not less than the battery charge threshold value 230, EC 204 may provide a false value for the battery capacity. In an example, EC 204 may store the true or false value for the battery capacity in value table 240.

In certain examples, EC 204 may determine whether information handling system 200 is in a bag or similar enclosure, check the system temperature, and the battery capacity at substantially the same time, in sequence one after another, or the like. EC 204 may monitor value table 240 to determine whether one or more of the fields in the value table is true. In an example, the different fields of value table 204 may be associated with a different indicator. For example, one field of value table 240 may be associated with the SIAB ambient light indicator, another field of the value table may be associated with the SIAB proximity indicator, another field of the value table may be associated with the battery capacity indicator, another field of the value table may be associated with the system temperature indicator, or the like. If one or more of the fields in value table 204 has a true value, EC 204 may determine that information handling system 200 should be forced out of stuck mode 314 of the process to enter MODS power state 304 of FIG. 3.

In response to the determination that information handling system 200 should be forced out of stuck mode 314, EC 204 may issue a fake lid event. In an example, the fake lid event may assert that a lid, such as lid 104 of FIG. 1, has been opened. For example, EC 204 may provide a system control interrupt (SCI) that may emulate a lid open event. In an example, EC 204 may provide the SCI lid open event to OS 212, which in turn may abort the MODS entry process. In certain examples, EC 204 may also provide a hibernate signal to OS 212, and the combination of the SCI lid open event and hibernate signal may cause the OS to transition back to full power state 302 and then to hibernate power state 306 as indicated by the dotted arrow 412 in FIG. 4. In an example, the SCI lid open event and hibernate signal may be combined into a single signal sent from EC 204 to OS 212. In certain examples, the hibernate signal may be a shutdown signal if hibernate power state 306 of FIG. 4 is not responsive.

In an example, EC 204 may improve information handling system 204 by forcing an exit of the MODS entry process when OS 212 stalls and cannot properly enter MODS power state 304 as described herein. The force exit of MODS entry may prevent over heating of information handling system 200 when OS 212 does not properly enter MODS power state 304.

Figure 5:
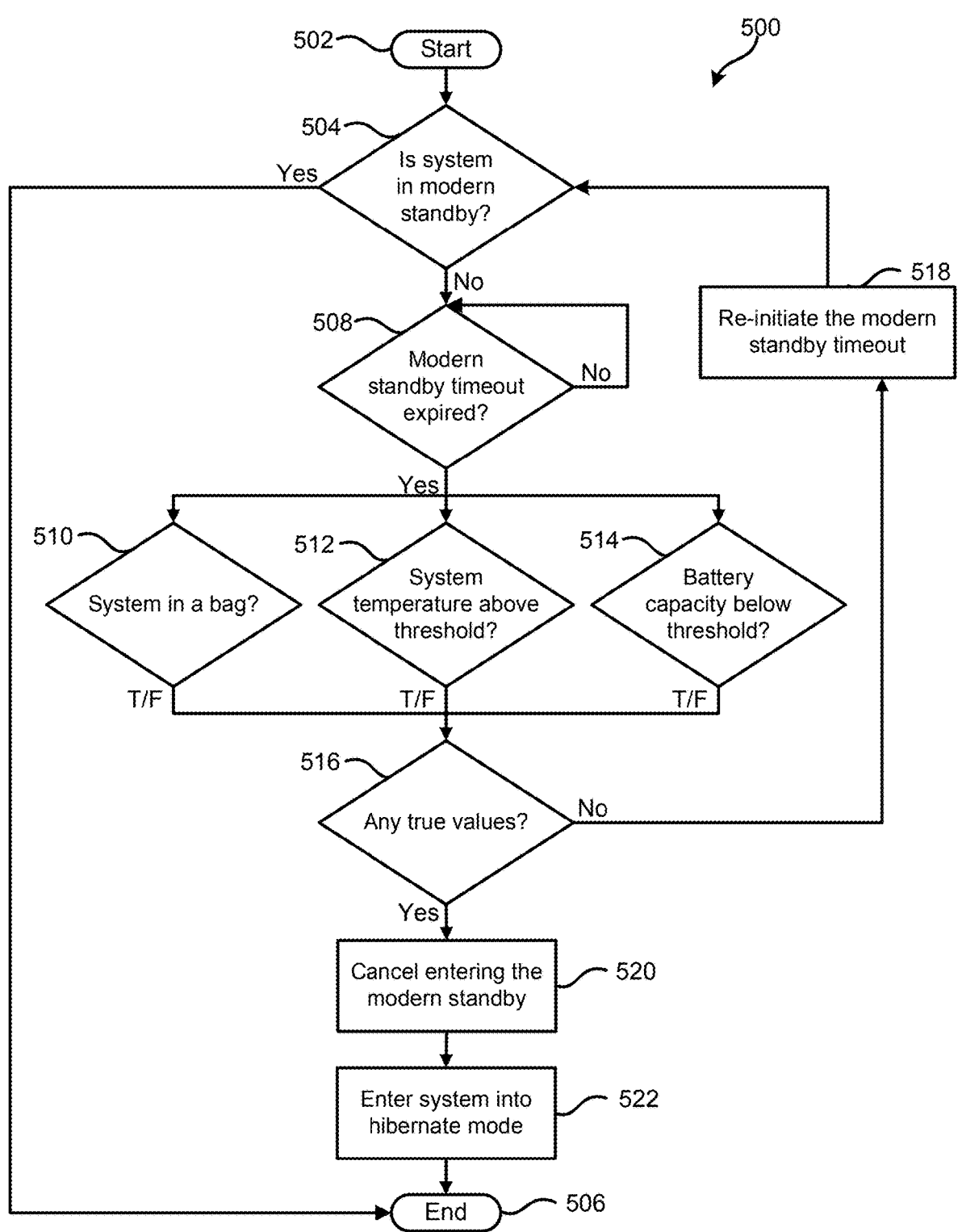
FIG. 5 is a flow diagram of a method for exiting an unresponsive modern standby state according to at least one embodiment of the present disclosure.

FIG. 5 is a flow diagram of a method 500 for exiting an unresponsive modern standby state according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, embedded controller 204 of FIG. 2, or any other type of controller, device, module, processor, or any combination thereof, operable to employ all, or portions of, the method of FIG. 5.

At block 504, a determination is made whether a system is in a modern standby state. In an example, the system may refer to an operating system (OS) of an information handling system. In response to the system being in the modern standby state, the flow ends at block 506. In response to the system not being in the modern standby state, a determination is made whether a modern standby timeout has expired at block 508. In an example, the modern standby timeout may be set for any particular amount of time after which the chances that the information handling system enters the modern standby state is substantially diminished. In certain examples, the EC may monitor the modern standby timeout to determine whether it has expired.

In response to expiration of the modern standby timeout, a determination is made whether the information handling system is in a bag at block 510. In an example, the determination of whether the information handling system is in a bag may be performed based on any suitable operations. For example, the determination of whether the information handling system is in a bag may be based on ambient light, proximity sensor, or the like. In an example, an ambient light sensor may detect the amount of ambient light around the information handling system and provide the detected amount of ambient light to an EC. In certain examples, the EC may compare the detected amount of ambient light to a threshold amount. When the detected ambient light is below the threshold amount, the EC may determine that the information handling system is in a bag. The EC may also receive distance measurements from a proximity sensor and determine whether the information handling system is in a bag based on the distance measurements. If the information handling system is in a bag, a true value is provided at block 510. However, if the information handling system is not in a bag, a false value is provided at block 510.

In response to expiration of the modern standby timeout, a determination is made whether a system temperature is above a threshold value at block 512. In an example, the EC may receive temperatures for areas of the information handling system, such as a memory, the CPU, the GPU, or the like. The EC may compare each of the received temperatures to the temperature threshold value. The EC may determine that the temperature of the information handling system has exceeded the temperature threshold value if any of the received temperatures is above the threshold. If the system temperature is above the threshold value, a true value is provided at block 512. If the system temperature is not above the threshold value, a false value is provided at block 512.

In response to expiration of the modern standby timeout, a determination is made whether a battery capacity is below a battery charge threshold value at block 514. In an example, the battery charge threshold value may be any suitable battery capacity level, such as a capacity percentage that is higher than a system shutdown percentage. The determination of whether the battery capacity is below the battery charge threshold value may be performed by any suitable operations. For example, the EC may receive the current battery capacity and compare the current capacity to a threshold capacity. If the battery capacity is less than the battery charge threshold value, a true value is provided at block 514. If the battery capacity is not less than the battery charge threshold value, a false value is provided at block 514.

At block 516, a determination is made whether a true value is received from block 510, 512, or 514. If no true value is received, the modern standby timeout is reinitiated at block 518 and the flow continues as stated above at block 504. If a true value is received, the operation of entering the system OS into the modern standby state is canceled at block 520. At block 522, the OS is entered into a hibernate mode and the flow ends at block 506. In certain examples, the system may enter the hibernate mode based on a fake lid open event signal and a hibernate signal. The fake lid open event signal may cause the OS to exit the modern standby state. In an example, the fake lid open event signal and the hibernate signal may be combined into a single signal provided by the EC to the OS.

Figure 6:
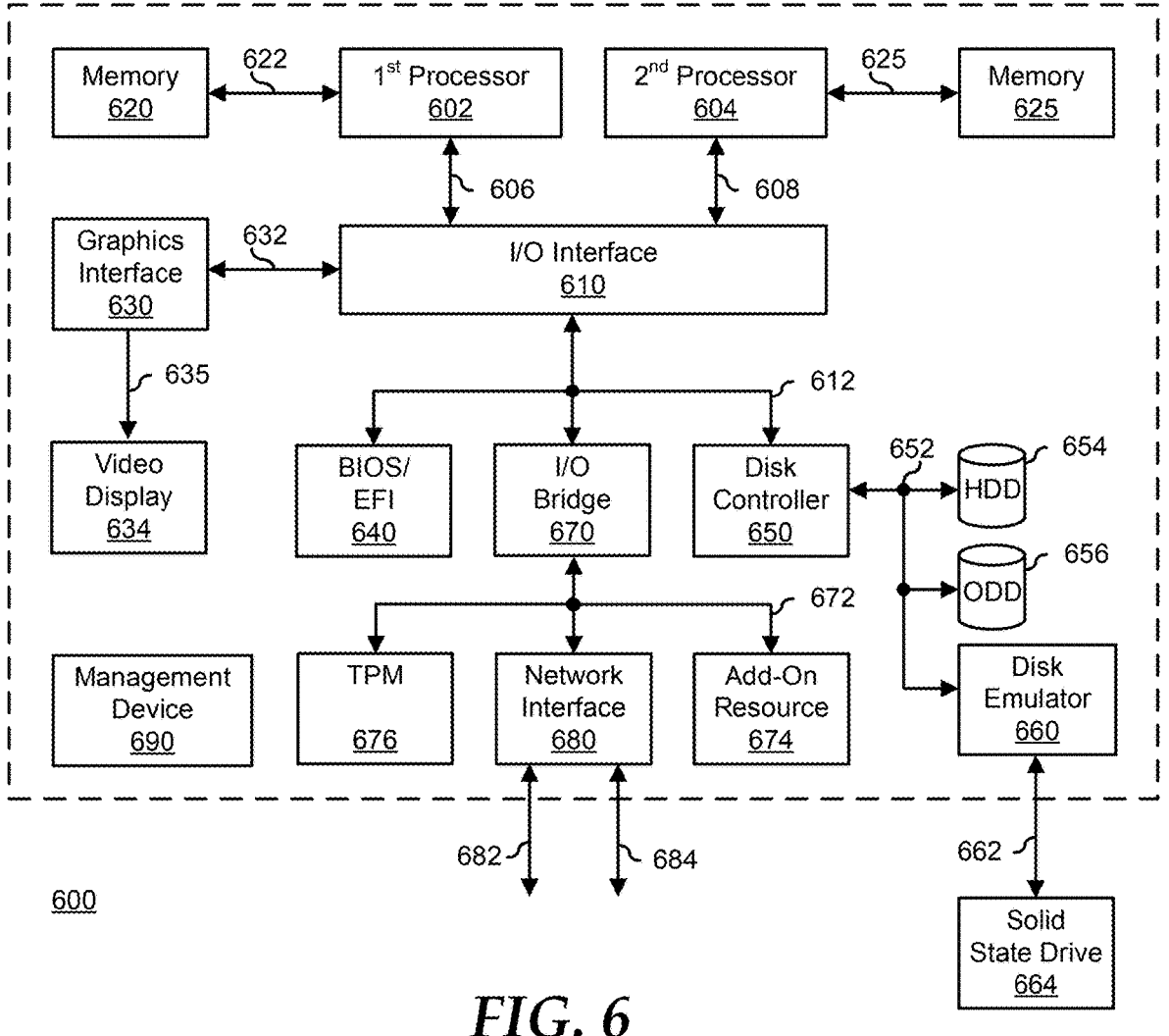
FIG. 6 is a block diagram of a general information handling system according to an embodiment of the present disclosure.

FIG. 6 shows a generalized embodiment of an information handling system 600 according to an embodiment of the present disclosure. Information handling system 600 may be substantially similar to information handling system 100 of FIG. 1 and information handling system 200 of FIG. 2. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 4394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device

680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (IDRAC), an Embedded Controller (EC), or the like. Management device 690 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a memory to store a plurality of threshold values associated with a current state of the information handling system; and
an embedded controller to communicate with the memory, the embedded controller to:
determine whether the information handling system has initiated a modern standby (MODS) power state entry;
in response to the initiation of the MODS power state entry, determine whether a MODS timeout has expired prior to a completion of the MODS power state entry;
in response to the MODS timeout having expired, determine whether one of the threshold values has been exceeded;
in response to one of the threshold values having been exceeded, provide a system control interrupt to an operating system of the information handling system, wherein the system control interrupt emulates a lid open event; and
in response to the system control interrupt that emulates the lid open event, force the information handling system to exit the initiated MODS power state entry, transition back to a full power state, and then enter the information handling system in a hibernate power state.

2. The information handling system of claim 1, wherein the memory further to store a value table, wherein the value table includes a plurality of fields and each different field is associated with a different one of the threshold values.

3. The information handling system of claim 2, wherein the embedded controller further to set a true value in one of the fields of the value table based on a corresponding threshold value being exceeded.

4. The information handling system of claim 3, wherein the determination of whether one of the threshold values has been exceeded includes the embedded controller to determine whether one of the fields in the value table being set to a true value.

5. The information handling system of claim 3, wherein in response to none of the fields in the value table being set to the true value, the embedded controller to reset the MODS timeout.

6. The information handling system of claim 1, wherein the plurality of threshold values includes a battery charge threshold value, a temperature threshold value, an ambient light threshold value, and a distance threshold value.

7. The information handling system of claim 6, wherein the embedded controller further to utilize the ambient light threshold value and the distance threshold value to determine whether the information handling system is in a bag.

8. A method comprising:
storing, in a memory of an information handling system, a plurality of threshold values associated with a current state of the information handling system;
determining, by an embedded controller of the information handling system, whether the information handling system has initiated a modern standby (MODS) power state entry;
in response to the initiation of the MODS power state entry, determining whether a MODS timeout has expired prior to a completion of the MODS power state entry;

in response to the MODS timeout having expired, determining whether one of the threshold values has been exceeded;
in response to one of the threshold values having been exceeded, providing a system control interrupt to an operating system of the information handling system, wherein the system control interrupt emulates a lid open event; and
in response to the system control interrupt that emulates the lid open event, forcing, by the embedded controller, the information handling system to exit the initiated MODS power state entry, transition back to a full power state, and then enter the information handling system in a hibernate power state.

9. The method of claim 8, further comprising: storing a value table in the memory, wherein the value table includes a plurality of fields and each different field is associated with a different one of the threshold values.

10. The method of claim 9, further comprising: setting a true value in one of the fields of the value table based on a corresponding threshold value being exceeded.

11. The method of claim 10, wherein the determining of whether one of the threshold values has been exceeded, the method further comprises: determining whether one of the fields in the value table being set to a true value.

12. The method of claim 10, wherein in response to none of the fields in the value table being set to the true value, the method further comprises: resetting the MODS timeout.

13. The method of claim 8, wherein the plurality of threshold values includes a battery charge threshold value, a temperature threshold value, an ambient light threshold value, and a distance threshold value.

14. The method of claim 13, further comprising: utilizing the ambient light threshold value and the distance threshold value to determine whether the information handling system is in a bag.

15. An information handling system comprising:
a memory to store a plurality of threshold values associated with a current state of the information handling system and store a value table, wherein the value table includes a plurality of fields and each different field is associated with a different one of the threshold values;
a lid sensor to provide a modern standby (MODS) power state entry request in response to a lid of the information handling system being closed; and
an embedded controller to:
receive the MODS power state entry request from the lid sensor;
in response to an initiation of a MODS power state entry within the information handling system, determine whether a MODS timeout has expired prior to a completion of the MODS power state entry;
when the MODS timeout has expired, then determine whether one of the threshold values has been exceeded; and
when one of the threshold values has been exceeded, then provide a system control interrupt to an operating system of the information handling system, wherein the system control interrupt emulates a lid open event; and
in response to the system control interrupt that emulates the lid open event, force the information handling system to exit the initiated MODS power state entry, transition back to a full power state, and then enter the information handling system in a hibernate power state.

16. The information handling system of claim 15, wherein the embedded controller further to set a true value in one of the fields of the value table based on a corresponding threshold value being exceeded.

17. The information handling system of claim 16, wherein the determination of whether one of the threshold values has been exceeded includes the embedded controller to determine whether one of the fields in the value table being set to a true value.

\* \* \* \* \*